US012322311B2

(12) United States Patent
Park et al.

(10) Patent No.: US 12,322,311 B2
(45) Date of Patent: Jun. 3, 2025

(54) DISPLAY APPARATUS AND METHOD OF DRIVING THE SAME

(71) Applicant: Samsung Display Co., LTD., Yongin-si (KR)

(72) Inventors: Geunjeong Park, Hwaseong-si (KR); Donggyu Lee, Yongin-si (KR); Jae-Hyeon Jeon, Seoul (KR); Jeong-Young Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/668,323

(22) Filed: Feb. 9, 2022

(65) Prior Publication Data

US 2022/0392382 A1 Dec. 8, 2022

(30) Foreign Application Priority Data

Feb. 10, 2021 (KR) ........................ 10-2021-0019508

(51) Int. Cl.
*G09G 3/20* (2006.01)

(52) U.S. Cl.
CPC ............. *G09G 3/20* (2013.01); *G09G 3/2096* (2013.01); *G09G 2300/0426* (2013.01); *G09G 2300/0819* (2013.01); *G09G 2300/0842* (2013.01); *G09G 2310/0267* (2013.01); *G09G 2310/0275* (2013.01); *G09G 2310/08* (2013.01);
(Continued)

(58) Field of Classification Search
CPC ................... G09G 3/20; G09G 3/2096; G09G 2300/0426; G09G 2300/0819; G09G 2300/0842; G09G 2310/0267; G09G 2310/08; G09G 2320/0233; G09G 2330/021; G09G 2330/028; G09G 3/3233; G09G 2300/0861; G09G 2310/0251; G09G 2340/0435; G09G 3/3225; G09G 2310/0275
See application file for complete search history.

(56) References Cited

U.S. PATENT DOCUMENTS

| | | | |
|---|---|---|---|
| 10,957,249 | B2 | 3/2021 | Lee |
| 11,232,735 | B2 | 1/2022 | Park et al. |

(Continued)

FOREIGN PATENT DOCUMENTS

| | | | |
|---|---|---|---|
| KR | 10-2018-0071572 | 6/2018 | |
| KR | 10-2019-0141812 | 12/2019 | |
| WO | WO-2019245189 A1 * | 12/2019 | ............... G09G 3/20 |

*Primary Examiner* — Jeff Piziali
(74) *Attorney, Agent, or Firm* — CANTOR COLBURN LLP

(57) ABSTRACT

A display apparatus includes a display panel, a driving controller, a gate driver, an emission driver and a data driver. The display panel includes a pixel including a driving switching element and a light emitting element. The driving controller is configured to determine a driving frequency varied according to input image data or a driving mode. The gate driver is configured to output a gate signal and a bias control signal to the pixel. The emission driver is configured to output an emission signal to the pixel. The data driver is configured to output a data voltage to the pixel. The bias control signal to apply a bias voltage to the driving switching element has a first width in a writing frame and a second width different from the first width in a holding frame.

10 Claims, 17 Drawing Sheets

(52) U.S. Cl.
CPC ............... *G09G 2320/0233* (2013.01); *G09G 2330/021* (2013.01); *G09G 2330/028* (2013.01)

(56) References Cited

U.S. PATENT DOCUMENTS

| | | | | |
|---|---|---|---|---|
| 2012/0013597 | A1* | 1/2012 | Han | G09G 3/3233 345/212 |
| 2016/0055792 | A1* | 2/2016 | Lee | G09G 3/3233 315/173 |
| 2016/0125798 | A1* | 5/2016 | Park | G09G 3/3233 345/204 |
| 2016/0148569 | A1* | 5/2016 | Park | G09G 3/3233 345/212 |
| 2016/0293103 | A1* | 10/2016 | Kimura | G09G 3/3233 |
| 2020/0135108 | A1* | 4/2020 | Li | G09G 3/3233 |
| 2021/0020109 | A1 | 1/2021 | Lin et al. | |
| 2021/0035502 | A1* | 2/2021 | Lee | G09G 3/3258 |
| 2021/0248960 | A1* | 8/2021 | Lee | G09G 3/3233 |
| 2022/0101785 | A1* | 3/2022 | Chung | G09G 3/3208 |
| 2022/0122534 | A1* | 4/2022 | Kim | G09G 3/3233 |
| 2022/0246088 | A1* | 8/2022 | Zhai | G09G 3/3233 |

* cited by examiner

DISPLAY APPARATUS AND METHOD OF DRIVING THE SAME

CROSS REFERENCE TO RELATED APPLICATION

This application claims priority from and the benefit of Korean Patent Application No. 10-2021-0019508, filed on Feb. 10, 2021, which is hereby incorporated by reference for all purposes as if fully set forth herein.

BACKGROUND

Field

Embodiments of the invention relate generally to a display apparatus and a method of driving the display apparatus. More particularly, embodiments of the present inventive concept relate to a display apparatus removing a difference between a luminance in a writing frame and a luminance in a holding frame due to a bias difference between the writing frame and the holding frame in a variable frequency driving method and a method of driving the display apparatus.

Discussion of the Background

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

To realistically express game images and movie images, a high resolution driving method and a high frequency driving method may be used. In addition, when supporting the game images and the movie images, the high frequency driving method and a variable frequency driving method are used to reduce a power consumption. In the variable frequency driving method, the display panel may have a writing frame when a data voltage is written to a pixel and a holding frame when the data voltage written to the pixel is maintained without writing a data voltage to the pixel.

Herein, a degree of a bias of the writing frame and a degree of a bias of the holding frame may be different from each other so that a luminance of an image in the writing frame and a luminance of an image in the holding frame may be different from each other. A display quality of the display panel may be deteriorated due to the difference of the luminances.

The above information disclosed in this Background section is only for understanding of the background of the inventive concepts, and, therefore, it may contain information that does not constitute prior art.

SUMMARY

Embodiments of the present inventive concept provide a display apparatus capable of removing a difference between a luminance in a writing frame and a luminance in a holding frame in a variable frequency driving method to enhance a display quality of a display panel.

Additional features of the inventive concepts will be set forth in the description which follows, and in part will be apparent from the description, or may be learned by practice of the inventive concepts.

Embodiments of the present inventive concept also provide a method of driving the display apparatus.

In an embodiment of a display apparatus according to the present inventive concept, the display apparatus includes a display panel, a driving controller, a gate driver, an emission driver and a data driver. The display panel includes a pixel including a driving switching element and a light emitting element. The driving controller is configured to determine a driving frequency varied according to input image data or a driving mode. The gate driver is configured to output a gate signal and a bias control signal to the pixel. The emission driver is configured to output an emission signal to the pixel. The data driver is configured to output a data voltage to the pixel. The bias control signal for applying a bias voltage to the driving switching element has a first width in a writing frame and a second width different from the first width in a holding frame.

In an embodiment, the second width may be greater than the first width.

In an embodiment, when the driving frequency is a normal frequency, the display panel may only have the writing frames. When the driving frequency is a low driving frequency less than the normal frequency, the display panel may have the writing frame and the holding frame.

In an embodiment, the pixel may include a first pixel switching element including a control electrode connected to a first node, an input electrode connected to a second node and an output electrode connected to a third node, a second pixel switching element including a control electrode, an input electrode configured to receive a data voltage and an output electrode connected to a fourth node, a third pixel switching element including a control electrode, an input electrode connected to the first node and an output electrode connected to the third node, a fourth pixel switching element including a control electrode, an input electrode configured to receive an initialization voltage and an output electrode connected to the first node, a fifth pixel switching element including a control electrode, an input electrode configured to receive a reference voltage and an output electrode connected to the fourth node, a sixth pixel switching element including a control electrode, an input electrode connected to the third node and an output electrode connected to an anode electrode of a light emitting element, a seventh pixel switching element including a control electrode, an input electrode configured to receive the initialization voltage and an output electrode connected to the anode electrode of the light emitting element, an eighth pixel switching element including a control electrode, an input electrode configured to receive the bias voltage and an output electrode connected to the second node, a ninth pixel switching element including a control electrode, an input electrode configured to receive a high power voltage and an output electrode connected to the second node, the light emitting element including the anode electrode connected to the output electrode of the seventh pixel switching element and a cathode electrode configured to receive a low power voltage, a first capacitor including a first electrode configured to receive the high power voltage and a second electrode connected to the fourth node and a second capacitor including a first electrode connected to the fourth node and a second electrode connected to the first node.

In an embodiment, the bias control signal may be applied to the control electrode of the eighth pixel switching element.

In an embodiment, the bias control signal may be applied to the control electrode of the seventh pixel switching element.

In an embodiment, a first gate signal may be applied to the control electrode of the second pixel switching element.

In an embodiment, a second gate signal may be applied to the control electrode of the fourth pixel switching element. A third gate signal may be applied to the control electrode of the third pixel switching element and the control electrode of the fifth pixel switching element.

In an embodiment, a first emission signal may be applied to the control electrode of the ninth pixel switching element. A second emission signal may be applied to the control electrode of the sixth pixel switching element.

In an embodiment, the display apparatus may further include a power voltage generator configured to generate a high power voltage, a low power voltage, an initialization voltage, a reference voltage, the bias voltage and to output the high power voltage, the low power voltage, the initialization voltage, the reference voltage, the bias voltage to the pixel.

In an embodiment, the bias voltage of the holding frame may be greater than the bias voltage of the writing frame.

In an embodiment, the pixel may include a first pixel switching element including a control electrode connected to a first node, an input electrode connected to a second node and an output electrode connected to a third node, a second pixel switching element including a control electrode, an input electrode configured to receive the data voltage and an output electrode connected to a fourth node, a third pixel switching element including a control electrode, an input electrode connected to the first node and an output electrode connected to the third node, a fourth pixel switching element including a control electrode, an input electrode configured to receive a reference voltage and an output electrode connected to the fourth node, a fifth pixel switching element including a control electrode, an input electrode configured to receive a high power voltage and an output electrode connected to the second node, a sixth pixel switching element including a control electrode, an input electrode connected to the third node and an output electrode connected to an anode electrode of a light emitting element, a seventh pixel switching element including a control electrode, an input electrode configured to receive an initialization voltage and an output electrode connected to the anode electrode of the light emitting element, an eighth pixel switching element including a control electrode, an input electrode configured to receive the bias voltage and an output electrode connected to the second node, the light emitting element including the anode electrode connected to the output electrode of the seventh pixel switching element and a cathode electrode configured to receive a low power voltage, a first capacitor including a first electrode configured to receive the high power voltage and a second electrode connected to the first node and a second capacitor including a first electrode connected to the third node and a second electrode connected to the fourth node.

In an embodiment, the bias control signal may be applied to the control electrode of the eighth pixel switching element.

In an embodiment, a first gate signal may be applied to the control electrode of the second pixel switching element. A second gate signal may be applied to the control electrode of the third pixel switching element.

In an embodiment, a third gate signal may be applied to the control electrode of the fourth pixel switching element. A fourth gate signal may be applied to the control electrode of the seventh pixel switching element. The fourth gate signal may be same as a third gate signal applied to a next horizontal line.

In an embodiment of a display apparatus according to the present inventive concept, the display apparatus includes a display panel, a driving controller, a gate driver, an emission driver, a data driver and a power voltage generator. The display panel includes a pixel including a driving switching element and a light emitting element. The driving controller is configured to determine a driving frequency varied according to input image data or a driving mode. The gate driver is configured to output a gate signal and a bias control signal to the pixel. The emission driver is configured to output an emission signal to the pixel. The data driver is configured to output a data voltage to the pixel. The power voltage generator is configured to generate a bias voltage. The bias voltage of a writing frame is different from the bias voltage of a holding frame.

In an embodiment, when the driving frequency is a normal frequency, the display panel may only have the writing frames. When the driving frequency is a low driving frequency less than the normal frequency, the display panel may have the writing frame and the holding frame.

In an embodiment, the bias voltage of the writing frame may be greater than the bias voltage of the holding frame.

In an embodiment, a width of the bias control signal for applying the bias voltage to the driving switching element in the writing frame may be equal to a width of the bias control signal in the holding frame.

In an embodiment of a method of driving a display apparatus according to the present inventive concept, the method includes determining a driving frequency varied according to input image data or a driving mode, outputting a gate signal and a bias control signal to a pixel including a driving switching element and a light emitting element, outputting an emission signal to the pixel and outputting a data voltage to the pixel. The bias control signal for applying a bias voltage to the driving switching element has a first width in a writing frame and a second width different from the first width in a holding frame.

According to the display apparatus and the method of driving the display apparatus, the width of the bias control signal of the writing frame and the width of the bias control signal of the holding frame may be set differently in the variable frequency driving method or the bias voltage of the writing frame and the bias voltage of the holding frame may be set differently in the variable frequency driving method so that the difference of the degree of the bias of the writing frame and the degree of the bias of the holding frame may be removed in the variable frequency driving method.

Thus, the difference between the luminance in the writing frame and the luminance in the holding frame may be removed in the variable frequency driving method so that the display quality of the display panel may be enhanced.

In addition, the variable frequency driving method within a range in which the deterioration of the display quality is not generated may be operated so that the power consumption of the display apparatus may be reduced.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE INVENTIVE CONCEPT

Figure 1:
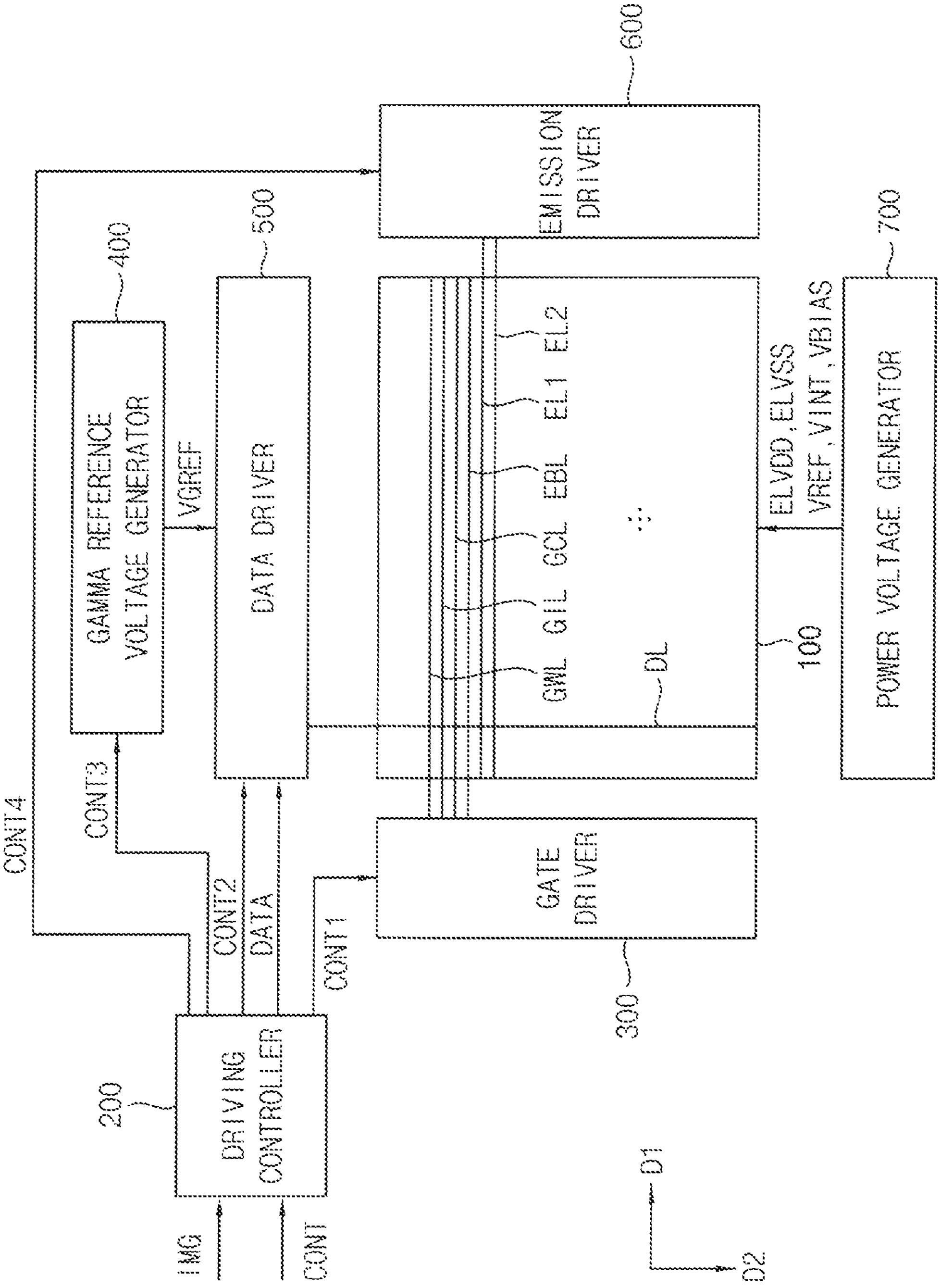
FIG. 1 is a block diagram illustrating a display apparatus according to an embodiment of the present inventive concept.

In the following description, for the purposes of explanation, numerous specific details are set forth in order to provide a thorough understanding of various exemplary embodiments or implementations of the invention. As used herein "embodiments" and "implementations" are interchangeable words that are no n-limiting examples of devices or methods employing one or more of the inventive concepts disclosed herein. It is apparent, however, that various exemplary embodiments may be practiced without these specific details or with one or more equivalent arrangements. In other instances, well-known structures and devices are illustrated in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, operations, operations, elements, components, and/or groups thereof, but do not preclude the presence or addition of one or more other features, integers, operations, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500 and an emission driver 600. The display panel driver may further include a power voltage generator 700.

The display panel 100 has a display region on which an image is displayed and a peripheral region adjacent to the display region.

The display panel 100 includes a plurality of gate lines GWL, GIL and GCL, a plurality of bias lines EBL, a plurality of data lines DL, a plurality of emission lines EL1 and EL2 and a plurality of pixels electrically connected to the gate lines GWL, GIL and GCL, the bias lines EBL, the data lines DL and the emission lines EL1 and EL2. The gate lines GWL, GIL and GCL and the bias lines EBL extend in a first direction D1, the data lines DL extend in a second direction D2 crossing the first direction D1 and the emission lines EL1 and EL2 extend in the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

In the present embodiment, the driving controller 200 may determine a driving frequency varied according to the input image data IMG or a driving mode. For example, when the input image data IMG represent a static image, the driving frequency may be relatively low. For example, when the driving mode is a gaming mode, the driving controller 200 may determine the driving frequency of the input image data IMG to be variable.

For example, when the driving frequency is a normal frequency, the display panel 100 may have a writing frame. For example, the normal frequency may be substantially the same as an input frequency of the input image data IMG.

For example, when the driving frequency is a low driving frequency less than the normal frequency, the display panel 100 may have the writing frame and a holding frame. In the writing frame, a data voltage may be written to the pixel of the display panel 100. In the holding frame, a data voltage may not be written to the pixel of the display panel 100 but the data voltage written to the pixel may be maintained.

The gate driver 300 generates gate signals driving the gate lines GWL, GIL and GCL in response to the first control signal CONT1 received from the driving controller 200. The gate driver 300 may output the gate signals to the gate lines GWL, GIL and GCL. For example, the gate driver 300 may be mounted on the peripheral region of the display panel 100. For example, the gate driver 300 may be integrated on the peripheral region of the display panel 100.

In the present embodiment, the gate driver 300 generates bias signals to drive the bias lines EBL in response to the first control signal CONT1 received from the driving controller 200. The gate driver 300 may output the bias signals to the bias lines EBL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500.

The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL1 and EL2 in response to the fourth control signal CONT4 received from the driving controller 200. The emission driver 600 may output the emission signals to the emission lines EL1 and EL2.

The power voltage generator 700 may generate a high power voltage ELVDD, a low power voltage ELVSS, an initialization voltage VINT, a reference voltage VREF and a bias voltage VBIAS. The power voltage generator 700 may output the high power voltage ELVDD, the low power voltage ELVSS, the initialization voltage VINT, the reference voltage VREF and the bias voltage VBIAS to the pixels of the display panel 100.

Figure 2:
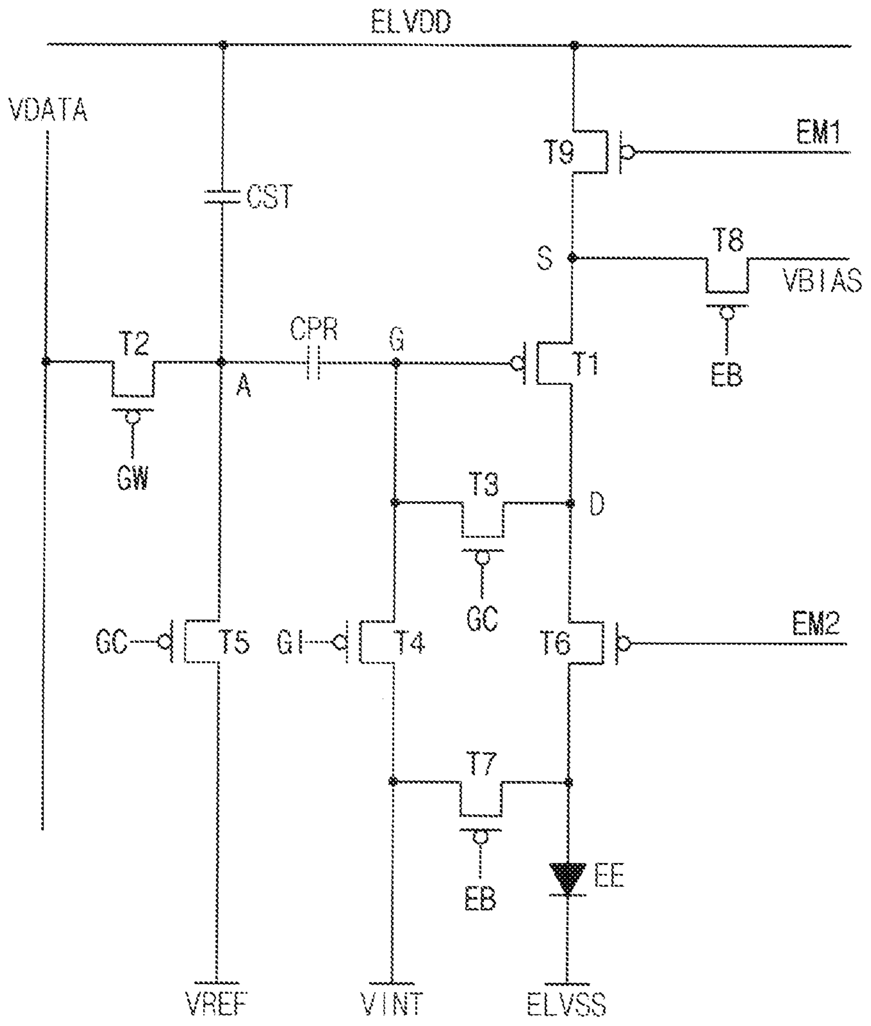
FIG. 2 is a circuit diagram illustrating a pixel of a display panel of FIG. 1.
Figure 3:
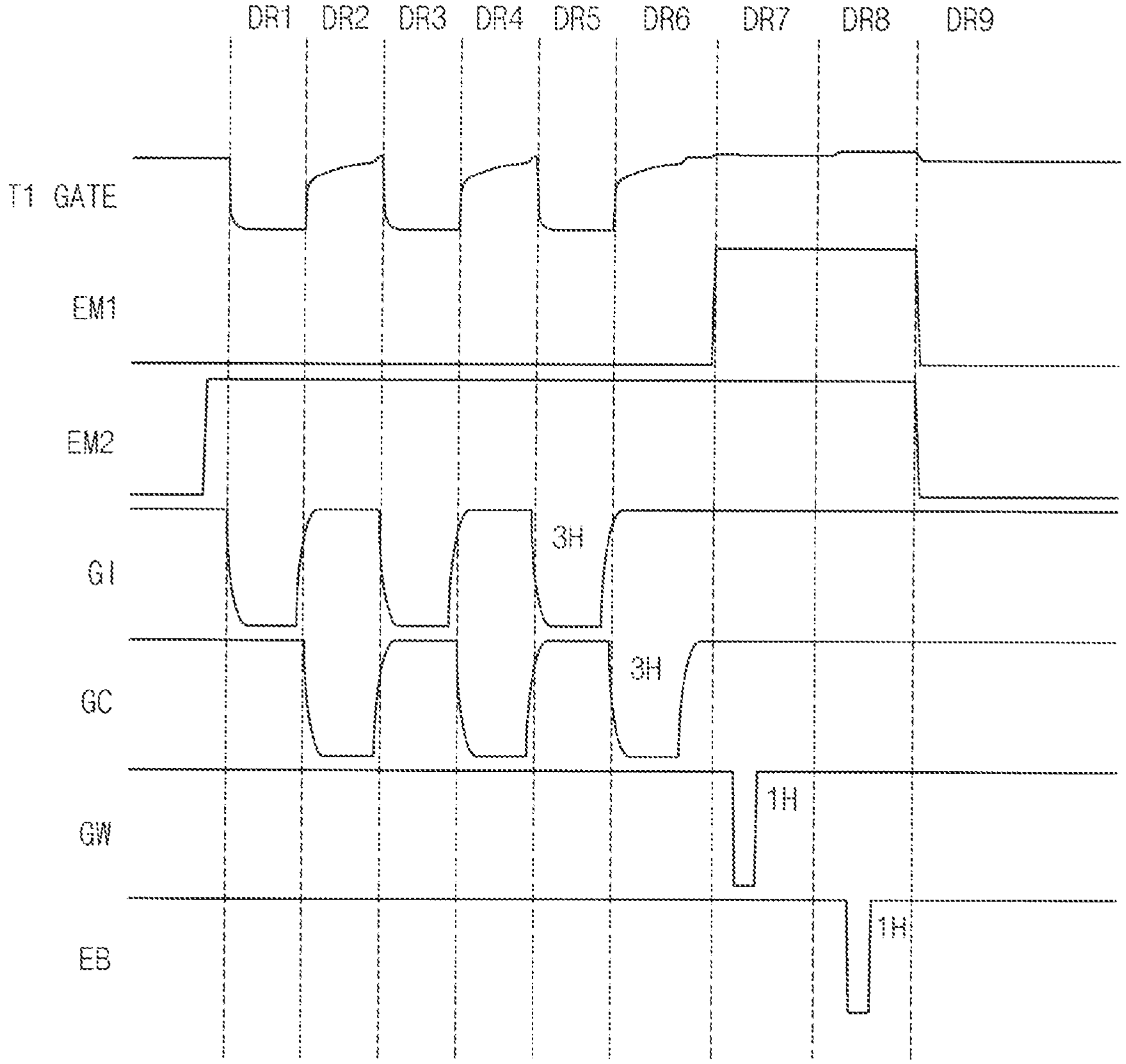
FIG. 3 is a timing diagram illustrating input signals and node signals applied to the pixel of FIG. 2.

FIG. 2 is a circuit diagram illustrating the pixel of the display panel 100 of FIG. 1. FIG. 3 is a timing diagram illustrating input signals and node signals applied to the pixel of FIG. 2.

Referring to FIGS. 1 to 3, the display panel 100 includes the plurality of the pixels. Each pixel includes a driving switching element T1 and a light emitting element EE.

The pixel may include a first pixel switching element T1 including a control electrode connected to a first node G, an input electrode connected to a second node S and an output electrode connected to a third node D, a second pixel switching element T2 including a control electrode, an input electrode receiving a data voltage VDATA and an output electrode connected to a fourth node A, a third pixel switching element T3 including a control electrode, an input electrode connected to the first node G and an output electrode connected to the third node D, a fourth pixel switching element T4 including a control electrode, an input electrode receiving the initialization voltage VINT and an output electrode connected to the first node G, a fifth pixel switching element T5 including a control electrode, an input electrode receiving the reference voltage VREF and an output electrode connected to the fourth node A, a sixth pixel switching element T6 including a control electrode, an input electrode connected to the third node D and an output electrode connected to an anode electrode of the light emitting element EE, a seventh pixel switching element T7 including a control electrode, an input electrode receiving the initialization voltage VINT and an output electrode connected to the anode electrode of the light emitting element EE, an eighth pixel switching element T8 including a control electrode, an input electrode receiving the bias voltage VBIAS and an output electrode connected to the second node S, a ninth pixel switching element T9 including a control electrode, an input electrode receiving the high power voltage ELVDD and an output electrode connected to the second node S, the light emitting element EE including the anode electrode connected to the output electrode of the seventh pixel switching element T7 and a cathode electrode receiving the low power voltage ELVSS, a first capacitor CST including a first electrode receiving the high power voltage ELVDD and a second electrode connected to the fourth node A and a second capacitor CPR including a first electrode connected to the fourth node A and a second electrode connected to the first node G.

A first gate signal GW may be applied to the control electrode of the second pixel switching element T2. A third gate signal GC may be applied to the control electrode of the third pixel switching element T3. A second gate signal GI may be applied to the control electrode of the fourth pixel switching element T4. The third gate signal GC may be applied to the control electrode of the fifth pixel switching element T5. A second emission signal EM2 may be applied to the control electrode of the sixth pixel switching element T6. A bias control signal EB may be applied to the control electrode of the seventh pixel switching element T7. The bias control signal EB may be applied to the control electrode of the eighth pixel switching element T8. A first emission signal EM1 may be applied to the control electrode of the ninth pixel switching element T9.

For example, the first to ninth pixel switching elements T1 to T9 may be P-type thin film transistors. The control electrodes of the first to ninth pixel switching elements T1 to T9 may be gate electrodes. The input electrodes of the first to ninth pixel switching elements T1 to T9 may be source electrodes. The output electrodes of the first to ninth pixel switching elements T1 to T9 may be drain electrodes.

As illustrated in FIG. 3, in first, third and fifth durations DR1, DR3 and DR5, the first emission signal EM1 may have a low level, the second emission signal EM2 may have a high level, the second gate signal GI may have a low level, the third gate signal GC may have a high level, the first gate signal GW may have a high level and the bias control signal EB may have a high level. In addition, in the first, third and fifth durations DR1, DR3 and DR5, a signal T1 GATE at the gate electrode of the first pixel switching element T1 may have a low level.

Herein, the low level means an active level and the high level means an inactive level.

In second, fourth and sixth durations DR2, DR4 and DR6, the first emission signal EM1 may have the low level, the second emission signal EM2 may have the high level, the second gate signal GI may have a high level, the third gate signal GC may have a low level, the first gate signal GW may have the high level and the bias control signal EB may have the high level. In addition, in the second, fourth and sixth durations DR2, DR4 and DR6, the signal T1 GATE at the gate electrode of the first pixel switching element T1 may have a high level.

In a seventh duration DR7, the first emission signal EM1 may have a high level, the second emission signal EM2 may have the high level, the second gate signal GI may have the high level, the third gate signal GC may have the high level, the first gate signal GW may have a low pulse and the bias control signal EB may have the high level. In addition, in the seventh duration DR7, the signal T1 GATE at the gate electrode of the first pixel switching element T1 may have the high level.

In an eighth duration DR8, the first emission signal EM1 may have the high level, the second emission signal EM2 may have the high level, the second gate signal GI may have the high level, the third gate signal GC may have the high level, the first gate signal GW may have a low pulse and the bias control signal EB may have the high level. In addition, in the eighth duration DR8, the signal T1 GATE at the gate electrode of the first pixel switching element T1 may have the high level.

In a ninth duration DR9, the first emission signal EM1 may have the low level, the second emission signal EM2 may have the low level, the second gate signal GI may have the high level, the third gate signal GC may have the high level, the first gate signal GW may have the high level and the bias control signal EB may have the high level. In addition, in the ninth duration DR9, the signal T1 GATE at the gate electrode of the first pixel switching element T1 may have the high level.

Figure 4:
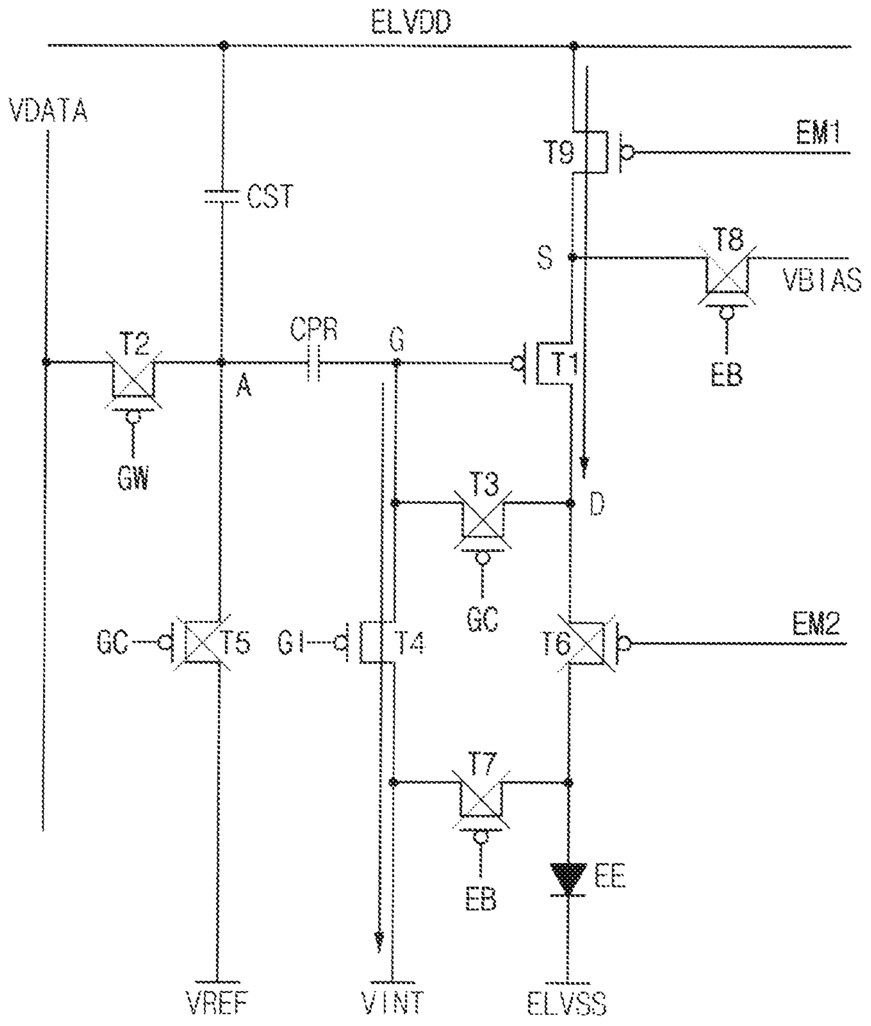
FIG. 4 is a circuit diagram illustrating an operation of the pixel of FIG. 2 in a first duration.
Figure 5:
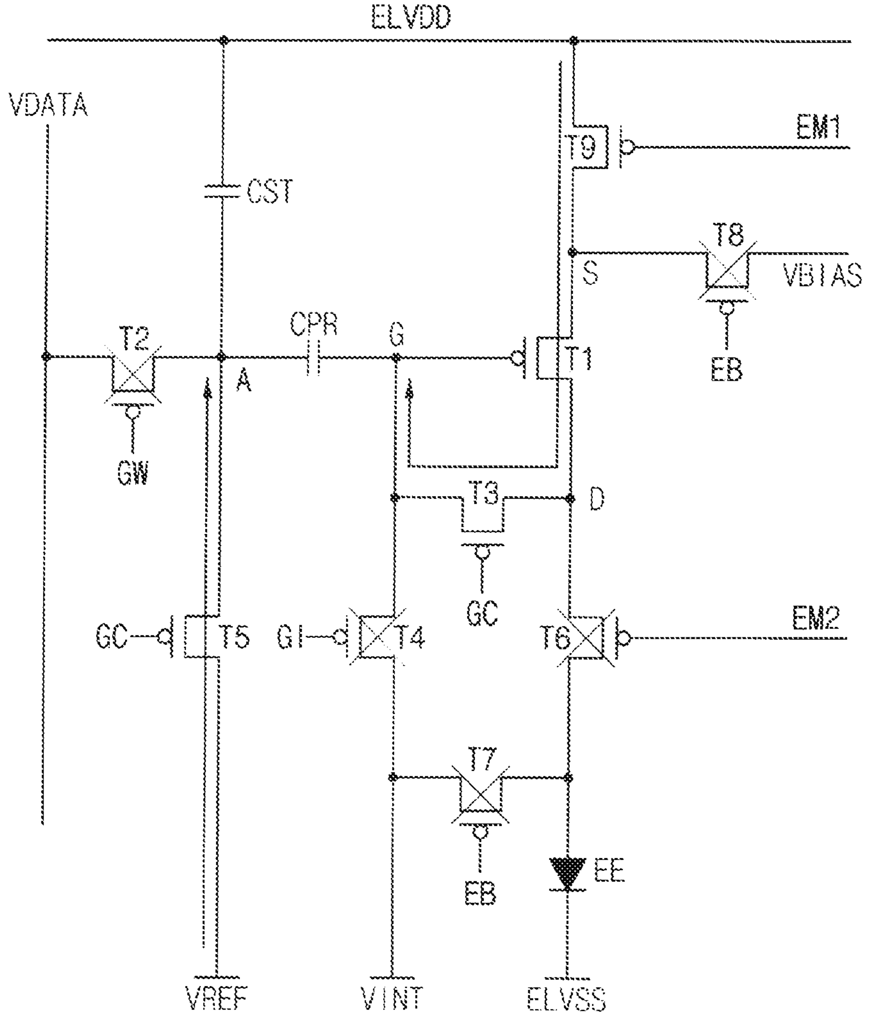
FIG. 5 is a circuit diagram illustrating an operation of the pixel of FIG. 2 in a second duration.
Figure 6:
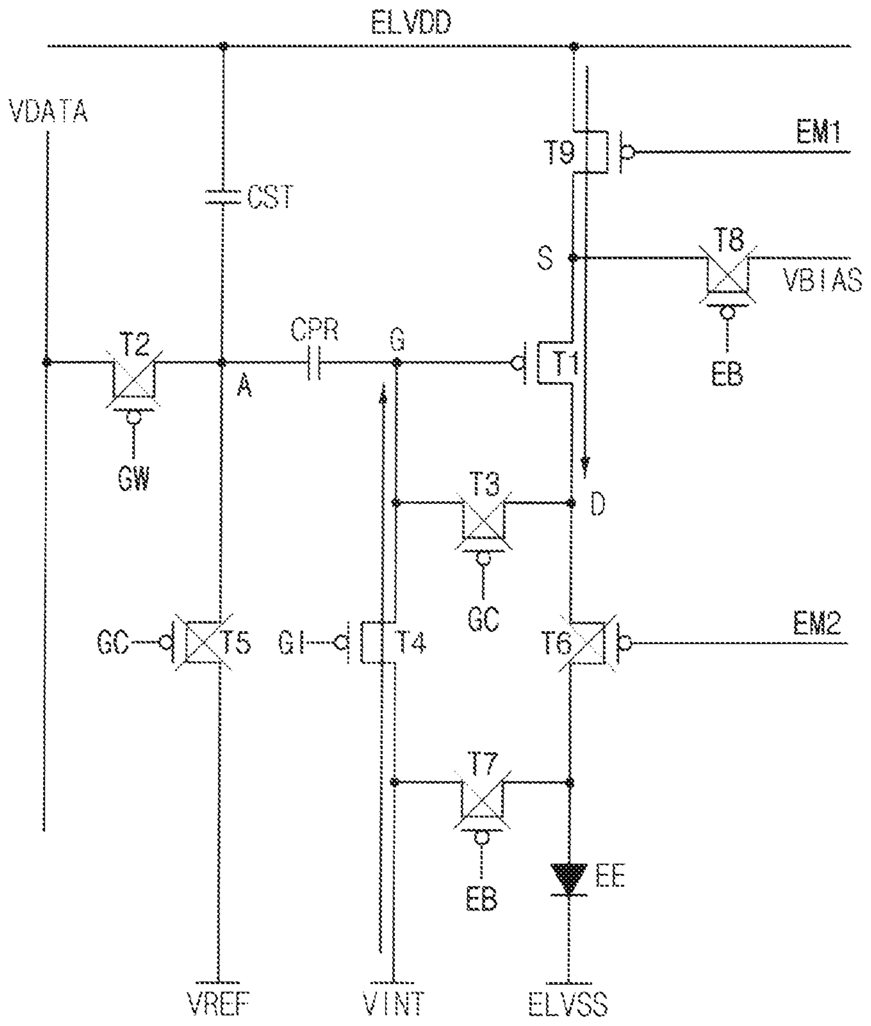
FIG. 6 is a circuit diagram illustrating an operation of the pixel of FIG. 2 in a third duration and a fifth duration.
Figure 7:
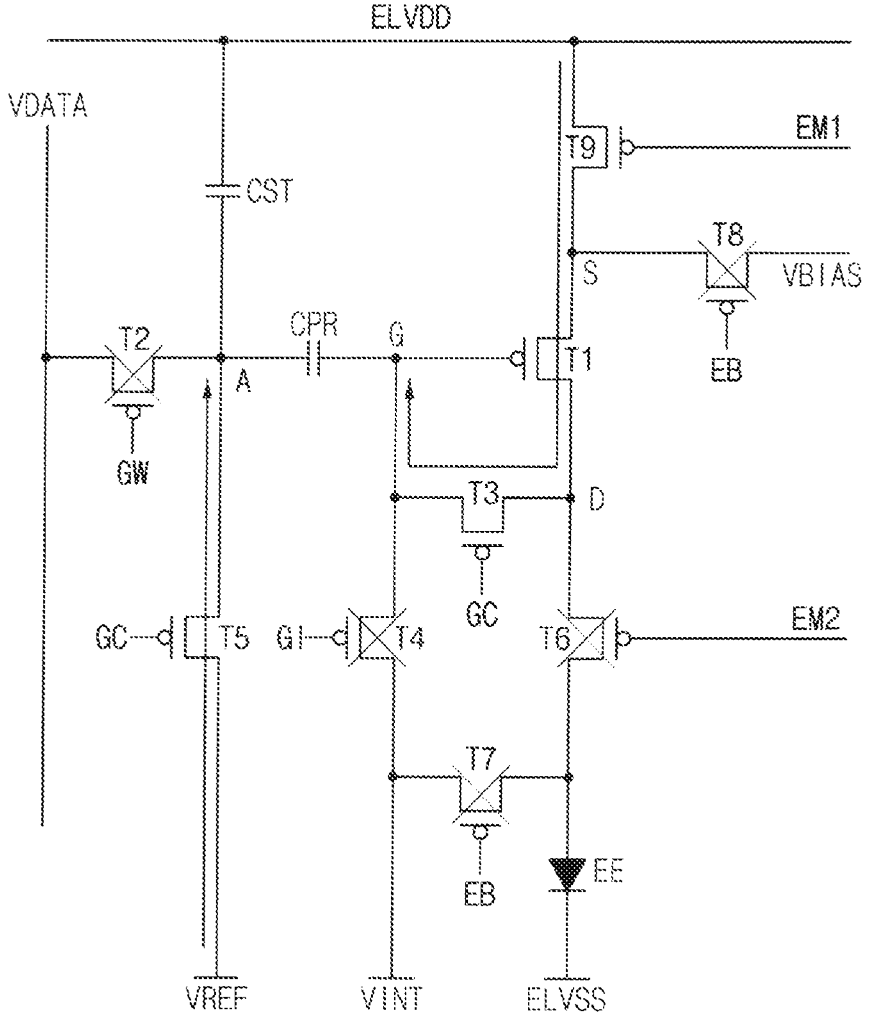
FIG. 7 is a circuit diagram illustrating an operation of the pixel of FIG. 2 in a fourth duration and a sixth duration.
Figure 8:
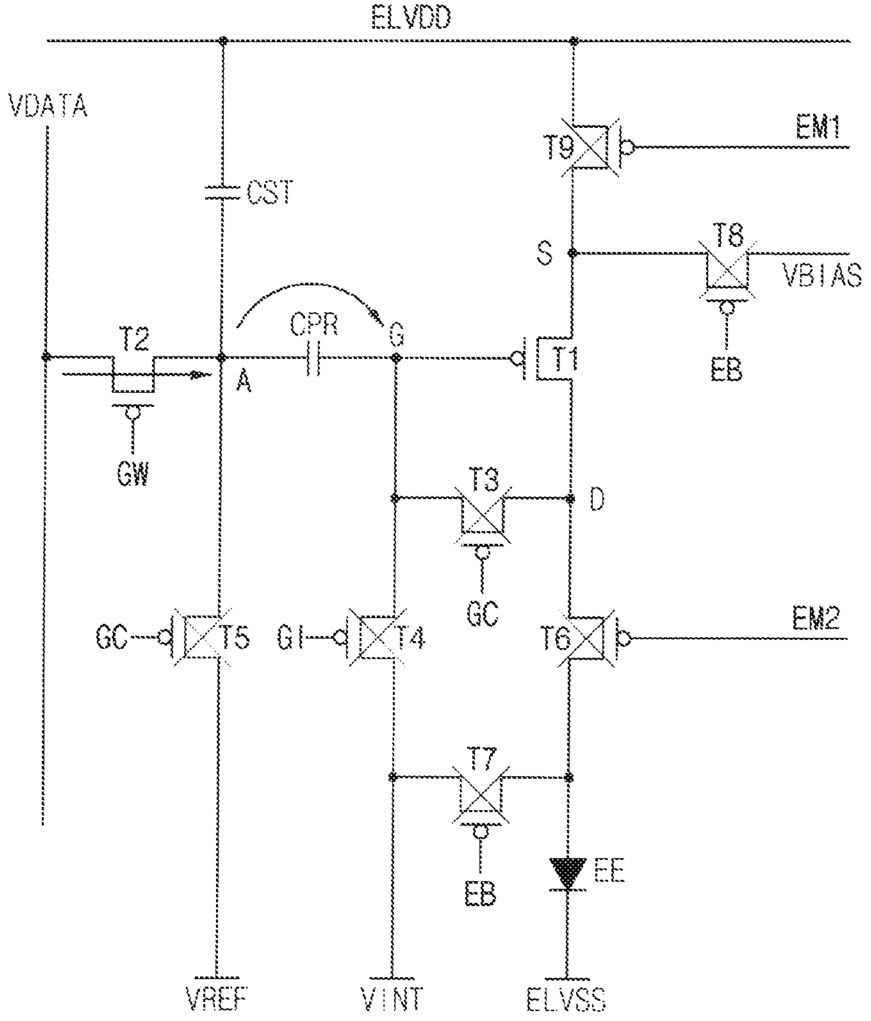
FIG. 8 is a circuit diagram illustrating an operation of the pixel of FIG. 2 in a seventh duration.
Figure 9:
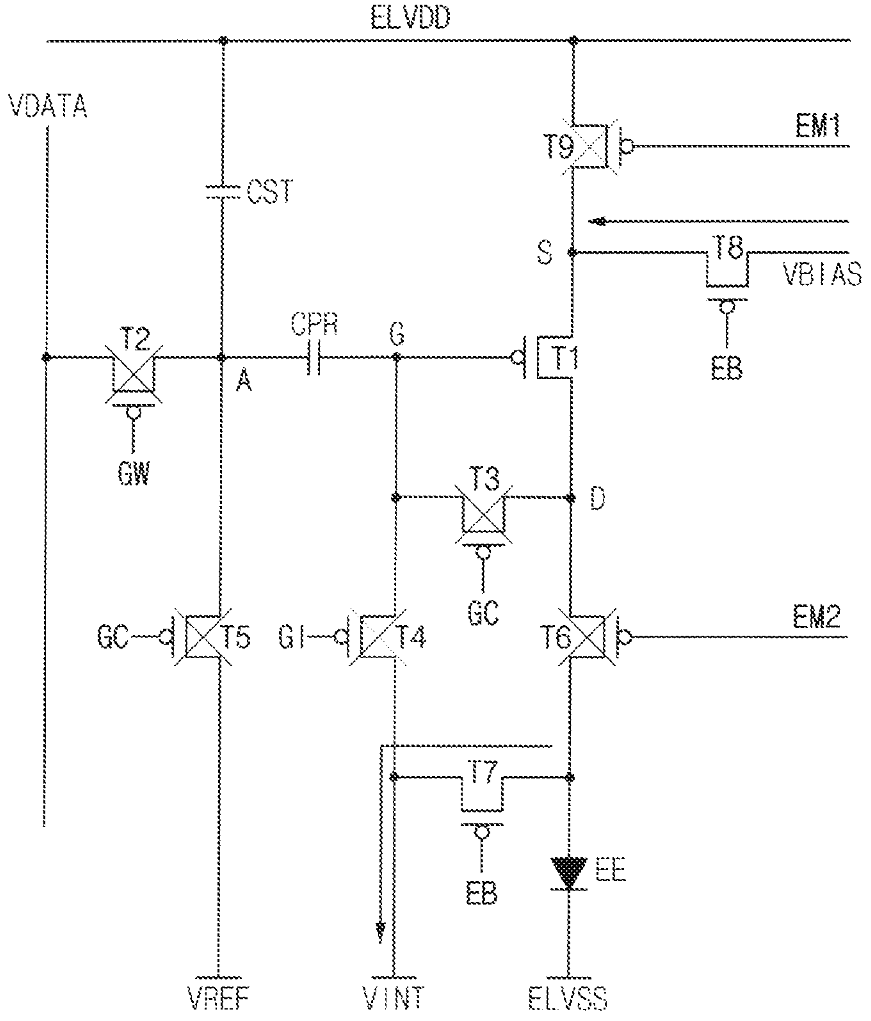
FIG. 9 is a circuit diagram illustrating an operation of the pixel of FIG. 2 in an eighth duration.
Figure 10:
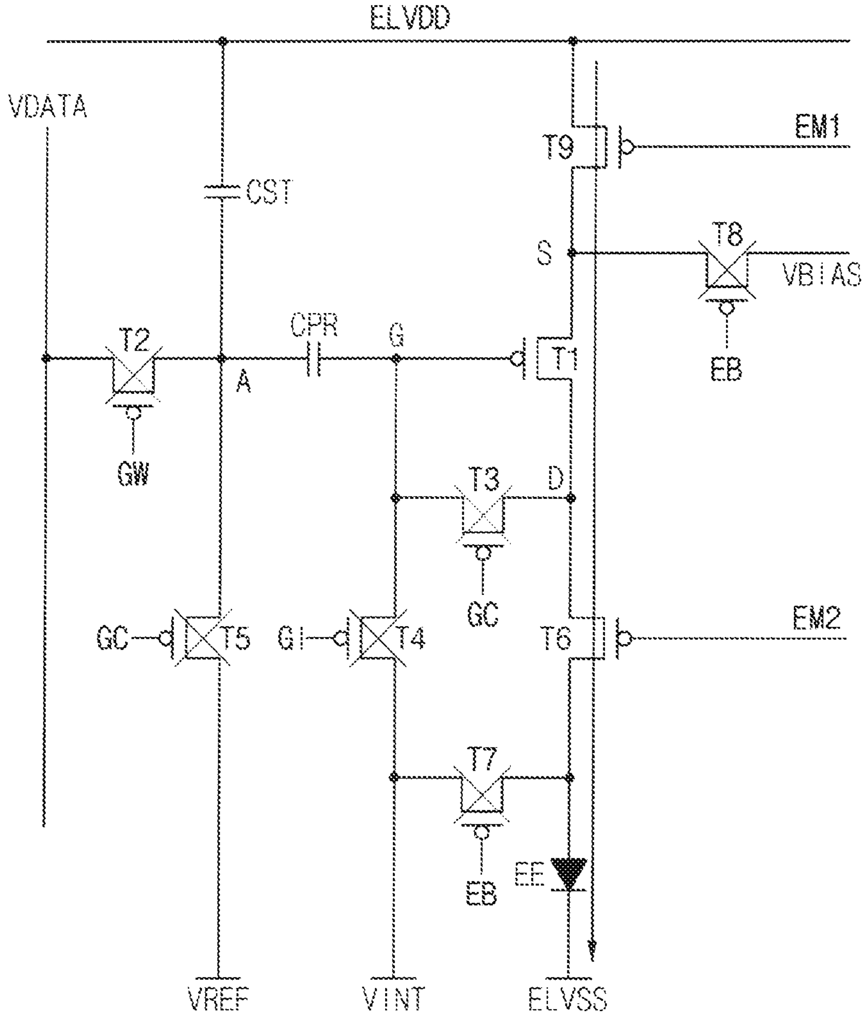
FIG. 10 is a circuit diagram illustrating an operation of the pixel of FIG. 2 in a ninth duration.

FIG. 4 is a circuit diagram illustrating an operation of the pixel of FIG. 2 in the first duration DR1. FIG. 5 is a circuit diagram illustrating an operation of the pixel of FIG. 2 in the second duration DR2. FIG. 6 is a circuit diagram illustrating an operation of the pixel of FIG. 2 in the third duration DR3 and the fifth duration DR5. FIG. 7 is a circuit diagram illustrating an operation of the pixel of FIG. 2 in the fourth duration DR4 and the sixth duration DR6. FIG. 8 is a circuit diagram illustrating an operation of the pixel of FIG. 2 in the seventh duration DR7. FIG. 9 is a circuit diagram illustrating an operation of the pixel of FIG. 2 in the eighth duration DR8. FIG. 10 is a circuit diagram illustrating an operation of the pixel of FIG. 2 in the ninth duration DR9.

As illustrated in FIG. 4, in the first duration DR1, the fourth pixel switching element T4 and the ninth pixel switching element T9 are turned on. In the first duration DR1, the fourth node A is in a state in which a previous data voltage is written. In the first duration DR1, the initialization voltage VINT is applied to the first node G through the fourth pixel switching element T4. In the first duration DR1, the high power voltage ELVDD is applied to the second node S through the ninth pixel switching element T9. The initialization voltage VINT is applied to the first node G in the first duration DR1 so that the first duration DR1 may be referred to a first initialization operation.

As illustrated in FIG. 5, in the second duration DR2, the third pixel switching element T3, the fifth pixel switching element T5 and the ninth pixel switching element T9 are turned on. In the second duration DR2, the reference voltage VREF is applied to the fourth node A through the fifth pixel switching element T5. Accordingly, the voltage at the fourth node A may be changed from the previous data voltage to the reference voltage VREF. In the second duration DR2, ELVDD-Vth is applied to the first node G through a path formed along the ninth pixel switching element T9, the first pixel switching element T1 and the third pixel switching element T3. Herein, Vth is a threshold voltage of the first pixel switching element T1. In the second duration DR2, the high power voltage ELVDD is applied to the second node S through the ninth pixel switching element T9. ELVDD-Vth is applied to the first node G in the second duration DR2 so that the second duration DR2 may be referred to a first threshold compensation operation. However, the voltage change at the fourth node A may affect the compensation of the threshold voltage Vth of the first node G in this operation so that the second duration DR2 may be also referred to an incomplete threshold compensation operation.

As illustrated in FIG. 6, in the third duration DR3 and the fifth duration DR5, the fourth pixel switching element T4 and the ninth pixel switching element T9 are turned on. In the third duration DR3 and the fifth duration DR5, the fourth node A is in a state in which the reference voltage VREF is written. In the third duration DR3 and the fifth duration DR5, the initialization voltage VINT is applied to the first node G through the fourth pixel switching element T4. In the third duration DR3 and the fifth duration DR5, the high power voltage ELVDD is applied to the second node S through the ninth pixel switching element T9. The initialization voltage VINT is applied to the first node G in the third duration DR3 and the fifth duration DR5 so that the third duration DR3 and the fifth duration DR5 may be respectively referred to a second initialization operation and a third initialization operation.

As illustrated in FIG. 7, in the fourth duration DR4 and the sixth duration DR6, the third pixel switching element T3, the fifth pixel switching element T5 and the ninth pixel switching element T9 are turned on. In the fourth duration DR4 and the sixth duration DR6, the reference voltage VREF is applied to the fourth node A through the fifth pixel switching element T5. In the fourth duration DR4 and the sixth duration DR6, ELVDD-Vth is applied to the first node G through the path formed along the ninth pixel switching element T9, the first pixel switching element T1 and the third pixel switching element T3. Herein, Vth is the threshold voltage of the first pixel switching element T1. In the fourth duration DR4 and the sixth duration DR6, the high power voltage ELVDD is applied to the second node S through the ninth pixel switching element T9. The ELVDD-Vth is applied to the first node G in the fourth duration DR4 and the sixth duration DR6 so that the fourth duration DR4 and the sixth duration DR6 may be respectively referred to a second threshold compensation operation and a third threshold compensation operation. The fourth node A is in a stable state with the reference voltage VREF so that the voltage at the fourth node A may not affect the compensation of the threshold voltage Vth of the first node Gin this operation so that the fourth duration DR4 and the sixth duration DR6 may be also referred to a complete threshold compensation operation.

Although the initialization operation is performed three times (DR1, DR3 and DR5) and the threshold compensation operation is performed three times (DR2, DR4 and DR6) in the present embodiment, the present invention may not be limited thereto. The initialization operation may be performed more or less than three times and the threshold compensation operation may be performed more or less than three times.

As illustrated in FIG. 8, in the seventh duration DR7, the second pixel switching element T2 is turned on. In the seventh duration DR7, the data voltage VDATA is applied to the fourth node A through the second pixel switching element T2. ELVDD-Vth+VDATA-VREF may be applied to the first node G by a coupling of the second capacitor CPR. ELVDD-Vth+VDATA-VREF is applied to the first node G in the seventh duration DR7 so that the seventh duration DR7 may be referred to a data writing operation.

As illustrated in FIG. 9, in the eighth duration DR8, the seventh pixel switching element T7 and the eighth pixel switching element T8 are turned on. In the eighth duration DR8, the fourth node A is in a state in which the data voltage VDATA is written. In the eighth duration DR8, the first node G is in a state in which ELVDD-Vth+VDATA-VREF is written by the coupling of the second capacitor CPR. In the eighth duration DR8, the bias voltage VBIAS is applied to the second node S through the eighth pixel switching element T8. In addition, the anode electrode of the light emitting element EE is initialized by the initialization voltage VINT through the seventh pixel switching element T7. The bias voltage VBIAS is applied to the input electrode of the first pixel switching element T1 through the eighth pixel switching element T8 in the eighth duration DR8 so that the eighth duration DR8 may be referred to a bias operation.

As illustrated in FIG. 10, in the ninth duration DR9, the first pixel switching element T1, the sixth pixel switching element T6 and the ninth pixel switching element T9 are turned on. In the ninth duration DR9, the fourth node A is in a state in which the data voltage VDATA is written. In the ninth duration DR9, the first node G is in a state in which ELVDD−Vth+VDATA−VREF is written by the coupling of the second capacitor CPR. In the ninth duration DR9, the high power voltage ELVDD is applied to the second node S through the ninth pixel switching element T9. In the ninth duration DR9, the light emitting element EE emits a light through a path formed along the first pixel switching element T1, the sixth pixel switching element T6 and the ninth pixel switching element T9 so that the ninth duration DR9 may be referred to an emission operation. Herein, a drain-source current of the first pixel switching element may be represented as following Equation 1.

$$I = \frac{1}{2}\mu Cox\frac{W}{L}(VREF - VDATA)^2 \quad \text{[Equation 1]}$$

In Equation 1, μ is a mobility of the first pixel switching element T1. Cox is a capacitance per unit area of the first pixel switching element T1. W/L is a width to length ratio of the first pixel switching element T1.

Figure 11:
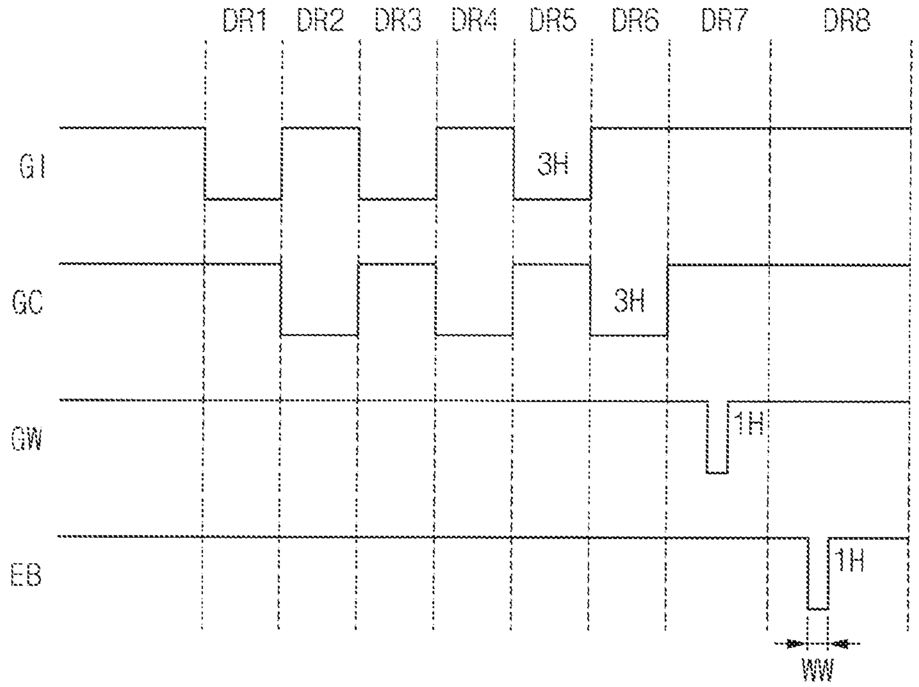
FIG. 11 is a timing diagram illustrating input signals applied to the pixel of FIG. 2 in a writing frame.
Figure 12:
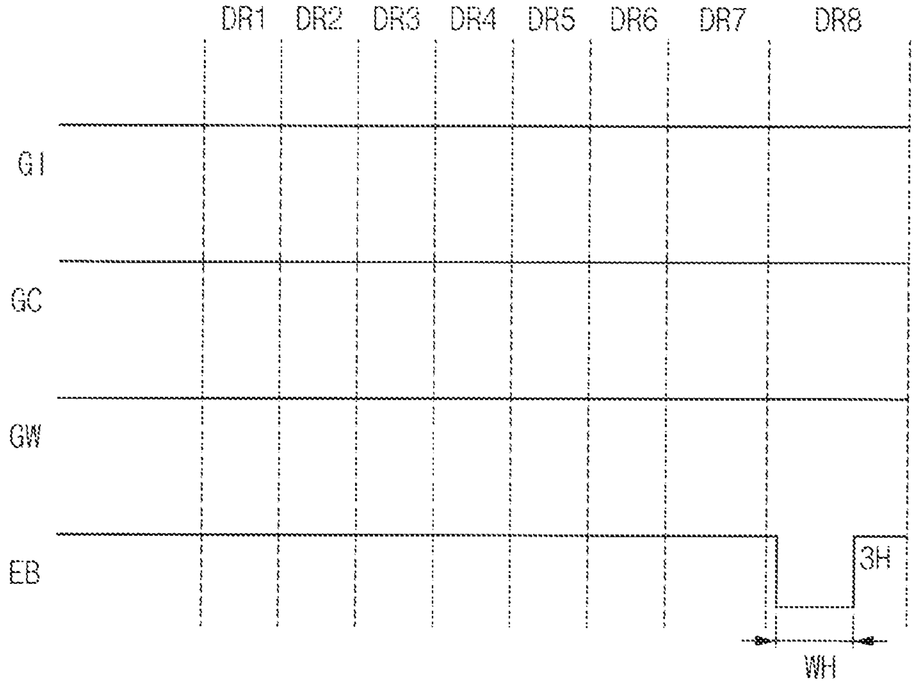
FIG. 12 is a timing diagram illustrating input signals applied to the pixel of FIG. 2 in a holding frame.

FIG. 11 is a timing diagram illustrating input signals applied to the pixel of FIG. 2 in a writing frame. FIG. 12 is a timing diagram illustrating input signals applied to the pixel of FIG. 2 in a holding frame.

Referring to FIGS. 1 to 12, as illustrated in FIG. 11, the pixel may emit a light in a process explained referring to FIGS. 4 to 10 in the writing frame. For example, in the writing frame, the first gate signal GW, the second gate signal GI and the third gate signal GC have active levels respectively so that the pixel may sequentially operate the initialization operation, the threshold compensation operation, the data writing frame, the bias operation and the emission operation.

In contrast, as illustrated in FIG. 12, the initialization operation, the threshold compensation operation and the data writing frame in the process explained referring to FIGS. 4 to 10 may be omitted in the holding frame. The bias operation and the emission operation in the process explained referring to FIGS. 4 to 10 may be sequentially operated in the holding frame.

In the initialization operation in the writing frame, the initialization voltage VINT is applied to the first node G and the high power voltage ELVDD is applied to the second node S so that a first bias operation of the first pixel switching element T1 may be operated. In addition, in the bias operation in the writing frame, a second bias operation of the first pixel switching element T1 may be operated using the bias voltage VBIAS by the eight pixel switching element T8.

In contrast, in the holding frame, the initialization operation is omitted so that the first bias operation of the first pixel switching element T1 may not be operated but only the second bias operation of the first pixel switching element T1 may be operated using the bias voltage VBIAS by the eight pixel switching element T8 in the bias operation.

Due to the difference between the degree of the bias of the writing frame and the degree of the bias of the holding frame, the luminance of the image in the writing frame and the luminance of the image in the holding frame may be different from each other. Thus, the display quality of the display panel 100 may be deteriorated due to the difference of the luminances.

In the present embodiment, the bias control signal EB for applying the bias voltage VBIAS to the driving switching element T1 may have a first width WW in the writing frame and a second width WH different from the first width WW in the holding frame. In the holding frame, an insufficient degree of the bias may be increased in the holding frame so that the second width WH may be set to be greater than the first width WW.

In addition, in the present embodiment, the bias voltage VBIAS in the writing frame may be equal to the bias voltage VBIAS in the holding frame. In the present embodiment, the power voltage generator 700 may generate the bias voltage VBIAS having a constant level regardless of the writing frame and the holding frame.

Figure 13:
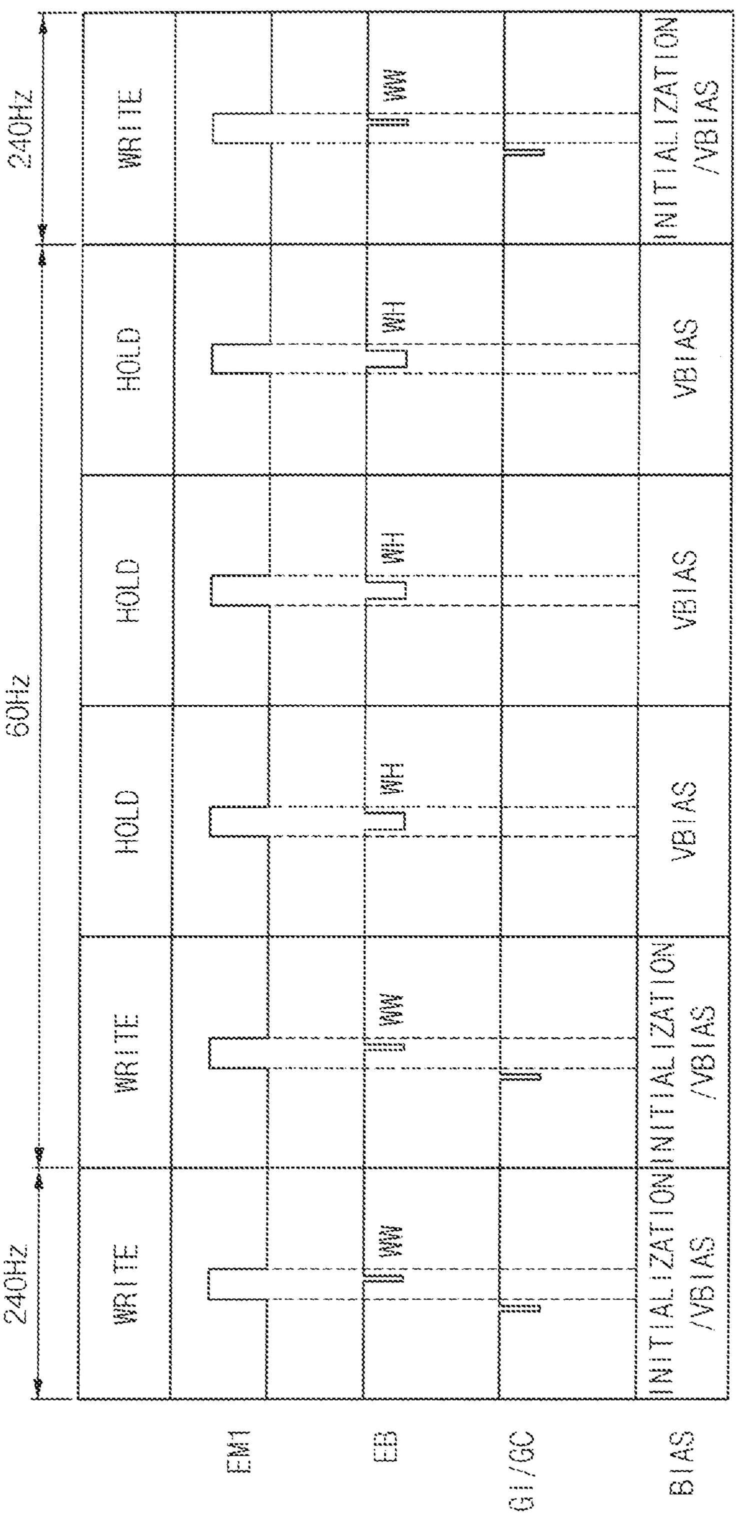
FIG. 13 is a timing diagram illustrating an operation of the display apparatus of FIG. 1 in the writing frame and in the holding frame.

FIG. 13 is a timing diagram illustrating an operation of the display apparatus of FIG. 1 in the writing frame and in the holding frame.

Referring to FIGS. 1 to 13, a first frame may have a frame rate of 240 Hz in FIG. 13.240 Hz may be the normal frequency. When the driving frequency is the normal frequency, the display panel 100 may only have the writing frames.

The first frame is the writing frame, so that the first bias operation of the first pixel switching element T1 may be operated using the initialization voltage VINT and the high power voltage ELVDD in the initialization operation and the second bias operation of the first pixel switching element T1 may be performed using the bias voltage VBIAS by the eight pixel switching element T8 in the bias operation.

Second to fifth frames may have a frame rate of 60 Hz. 60 Hz may be the low driving frequency less than the normal frequency.

The second frame is the writing frame and the third to fifth frames are the holding frames. The second frame is the writing frame, so that the first bias operation of the first pixel switching element T1 may be operated using the initialization voltage VINT and the high power voltage ELVDD in the initialization operation and the second bias operation of the first pixel switching element T1 may be performed using the bias voltage VBIAS by the eight pixel switching element T8 in the bias operation. In contrast, the third to fifth frames are the holding frames, so that the initialization operation is omitted and only the second bias operation of the first pixel switching element T1 may be conducted using the bias voltage VBIAS by the eight pixel switching element T8 in the bias operation.

The bias control signal EB for applying the bias voltage VBIAS to the driving switching element T1 may have the first width WW in the writing frame and the second width WH greater than the first width WW in the holding frame so that the insufficient degree of the bias in the holding frame may be compensated.

A sixth frame may have a frame rate of 240 Hz. 240 Hz may be the normal frequency.

According to the present embodiment, the width of the bias control signal EB of the writing frame and the width of the bias control signal EB of the holding frame may be set differently in the variable frequency driving method or the bias voltage of the writing frame and the bias voltage of the holding frame may be set differently in the variable frequency driving method so that the difference of the degree of the bias of the writing frame and the degree of the bias of the holding frame may be removed in the variable frequency driving method.

Thus, the difference between the luminance in the writing frame and the luminance in the holding frame may be removed in the variable frequency driving method so that the display quality of the display panel 100 may be enhanced.

In addition, the variable frequency driving method within a range in which the deterioration of the display quality is not generated may be operated so that the power consumption of the display apparatus may be reduced.

Figure 14:
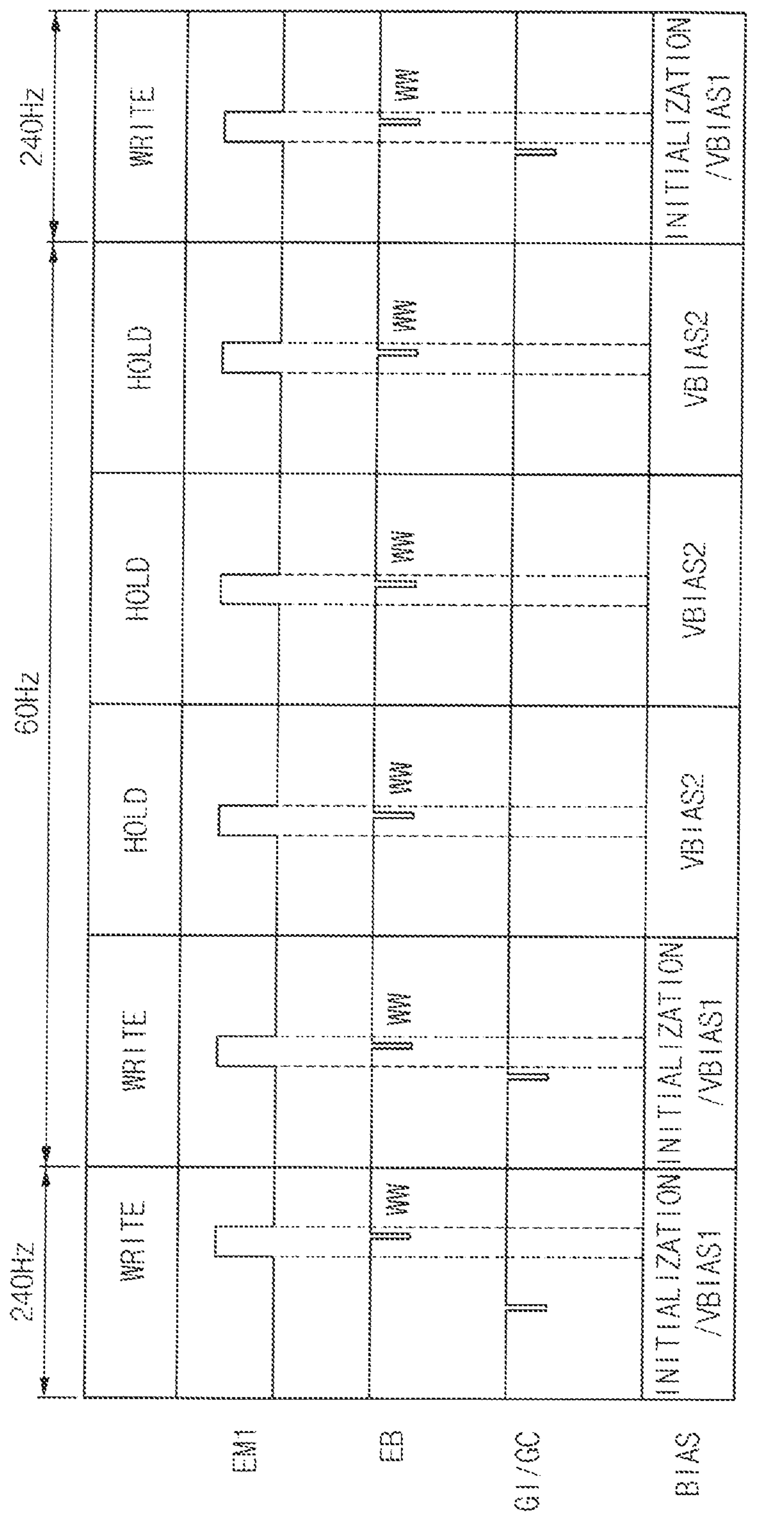
FIG. 14 is a timing diagram illustrating an operation of a display apparatus according to an embodiment of the present inventive concept in a writing frame and in a holding frame.

FIG. 14 is a timing diagram illustrating an operation of a display apparatus according to an embodiment of the present inventive concept in a writing frame and in a holding frame.

The display apparatus and the method of driving the display apparatus according to the present embodiment is substantially the same as the display apparatus and the method of driving the display apparatus of the previous embodiment explained referring to FIGS. 1 to 13 except for the method of compensating the insufficient degree of the bias. Thus, the same reference numerals will be used to refer to the same or like parts as those described in the previous embodiment of FIGS. 1 to 13 and any repetitive explanation concerning the above elements will be omitted.

Referring to FIG. 14, in the present embodiment, the bias control signal EB for applying the bias voltage VBIAS1 and VBIAS2 to the driving switching element T1 may have a first width WW in the writing frame and a second width WW equal to the first width WW in the holding frame. An insufficient degree of the bias may be increased in the holding frame so that, instead, the bias voltage VBIAS2 of the holding frame may be set to be greater than the bias voltage VBIAS1 of the writing frame.

In FIG. 14, a first frame may have a frame rate of 240 Hz in FIG. 14. 240 Hz may be the normal frequency. When the driving frequency is the normal frequency, the display panel 100 may only have the writing frames.

Second to fifth frames may have a frame rate of 60 Hz. 60 Hz may be the low driving frequency less than the normal frequency.

The second frame is the writing frame and the third to fifth frames are the holding frames. The second frame is the writing frame, so that the first bias operation of the first pixel switching element T1 may be operated using the initialization voltage VINT and the high power voltage ELVDD in the initialization operation and the second bias operation of the first pixel switching element T1 may be conducted using the bias voltage VBIAS by the eight pixel switching element T8 in the bias operation. In contrast, the third to fifth frames are the holding frames, so that the initialization operation is omitted and only the second bias operation of the first pixel switching element T1 may be operated using the bias voltage VBIAS by the eight pixel switching element T8 in the bias operation.

The bias control signal EB for applying the bias voltage VBIAS to the driving switching element T1 may have the first width WW in the writing frame and the first width WW in the holding frame. The bias voltage VBIAS2 of the holding frame may be set greater than the bias voltage VBIAS1 of the writing frame.

A sixth frame may have a frame rate of 240 Hz. 240 Hz may be the normal frequency.

According to the present embodiment, the width of the bias control signal EB of the writing frame and the width of the bias control signal EB of the holding frame may be set differently in the variable frequency driving method or the bias voltage of the writing frame and the bias voltage of the holding frame may be set differently in the variable frequency driving method so that the difference of the degree of the bias of the writing frame and the degree of the bias of the holding frame may be removed in the variable frequency driving method.

Thus, the difference between the luminance in the writing frame and the luminance in the holding frame may be removed in the variable frequency driving method so that the display quality of the display panel 100 may be enhanced.

In addition, the variable frequency driving method within a range in which the deterioration of the display quality is not generated may be operated so that the power consumption of the display apparatus may be reduced.

Figure 15:
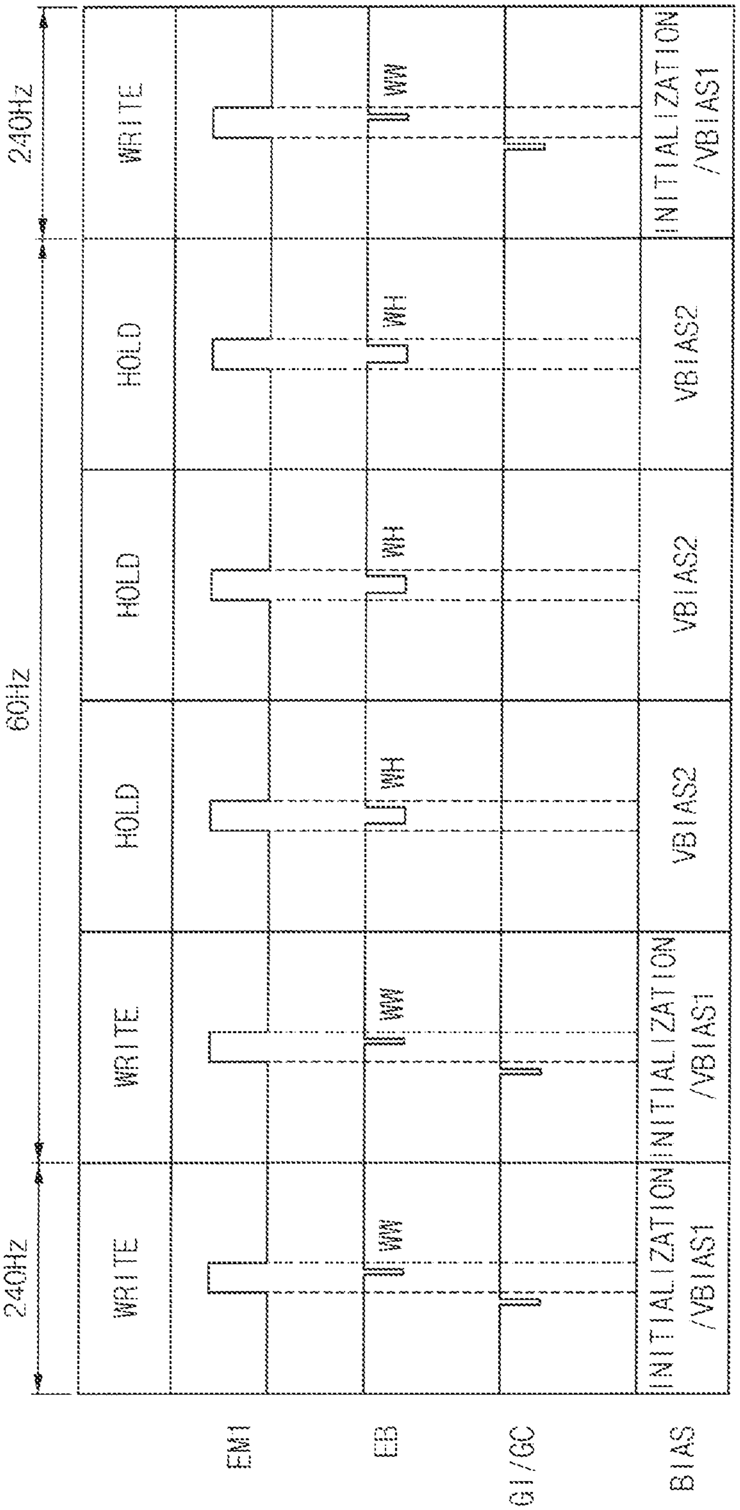
FIG. 15 is a timing diagram illustrating an operation of a display apparatus according to an embodiment of the present inventive concept in a writing frame and in a holding frame.

FIG. 15 is a timing diagram illustrating an operation of a display apparatus according to an embodiment of the present inventive concept in a writing frame and in a holding frame.

The display apparatus and the method of driving the display apparatus according to the present embodiment is substantially the same as the display apparatus and the method of driving the display apparatus of the previous embodiment explained referring to FIGS. 1 to 13 except for the method of compensating the insufficient degree of the bias. Thus, the same reference numerals will be used to refer to the same or like parts as those described in the previous embodiment of FIGS. 1 to 13 and any repetitive explanation concerning the above elements will be omitted.

Referring to FIG. 15, in the present embodiment, the bias control signal EB for applying the bias voltage VBIAS1 and VBIAS2 to the driving switching element T1 may have a first width WW in the writing frame and a second width WH different from the first width WW in the holding frame. An insufficient degree of the bias may be increased in the holding frame so that the second width WH may be set to be greater than the first width WW.

In addition, the bias voltage VBIAS2 of the holding frame may be set to be greater than the bias voltage VBIAS1 of the writing frame to increase the insufficient degree of the bias in the holding frame.

In FIG. 15, a first frame may have a frame rate of 240 Hz in FIG. 15. 240 Hz may be the normal frequency. When the driving frequency is the normal frequency, the display panel 100 may only have the writing frames.

Second to fifth frames may have a frame rate of 60 Hz. 60 Hz may be the low driving frequency less than the normal frequency.

The second frame is the writing frame and the third to fifth frames are the holding frames. The second frame is the writing frame, so that the first bias operation of the first pixel switching element T1 may be operated using the initialization voltage VINT and the high power voltage ELVDD in the initialization operation and the second bias operation of the first pixel switching element T1 may be operated using the bias voltage VBIAS by the eight pixel switching element T8 in the bias operation. In contrast, the third to fifth frames are the holding frames, so that the initialization operation is omitted and only the second bias operation of the first pixel switching element T1 may be operated using the bias voltage VBIAS by the eight pixel switching element T8 in the bias operation.

The bias control signal EB for applying the bias voltage VBIAS to the driving switching element T1 may have the first width WW in the writing frame and the second width WH greater than the first width WW in the holding frame so that the insufficient degree of the bias in the holding frame may be compensated.

In addition, the bias voltage VBIAS2 of the holding frame may be set greater than the bias voltage VBIAS1 of the writing frame.

A sixth frame may have a frame rate of 240 Hz. 240 Hz may be the normal frequency.

According to the present embodiment, the width of the bias control signal EB of the writing frame and the width of the bias control signal EB of the holding frame may be set differently in the variable frequency driving method or the bias voltage of the writing frame and the bias voltage of the holding frame may be set differently in the variable frequency driving method so that the difference of the degree of the bias of the writing frame and the degree of the bias of the holding frame may be removed in the variable frequency driving method.

Thus, the difference between the luminance in the writing frame and the luminance in the holding frame may be removed in the variable frequency driving method so that the display quality of the display panel 100 may be enhanced.

In addition, the variable frequency driving method within a range in which the deterioration of the display quality is not generated may be operated so that the power consumption of the display apparatus may be reduced.

Figure 16:
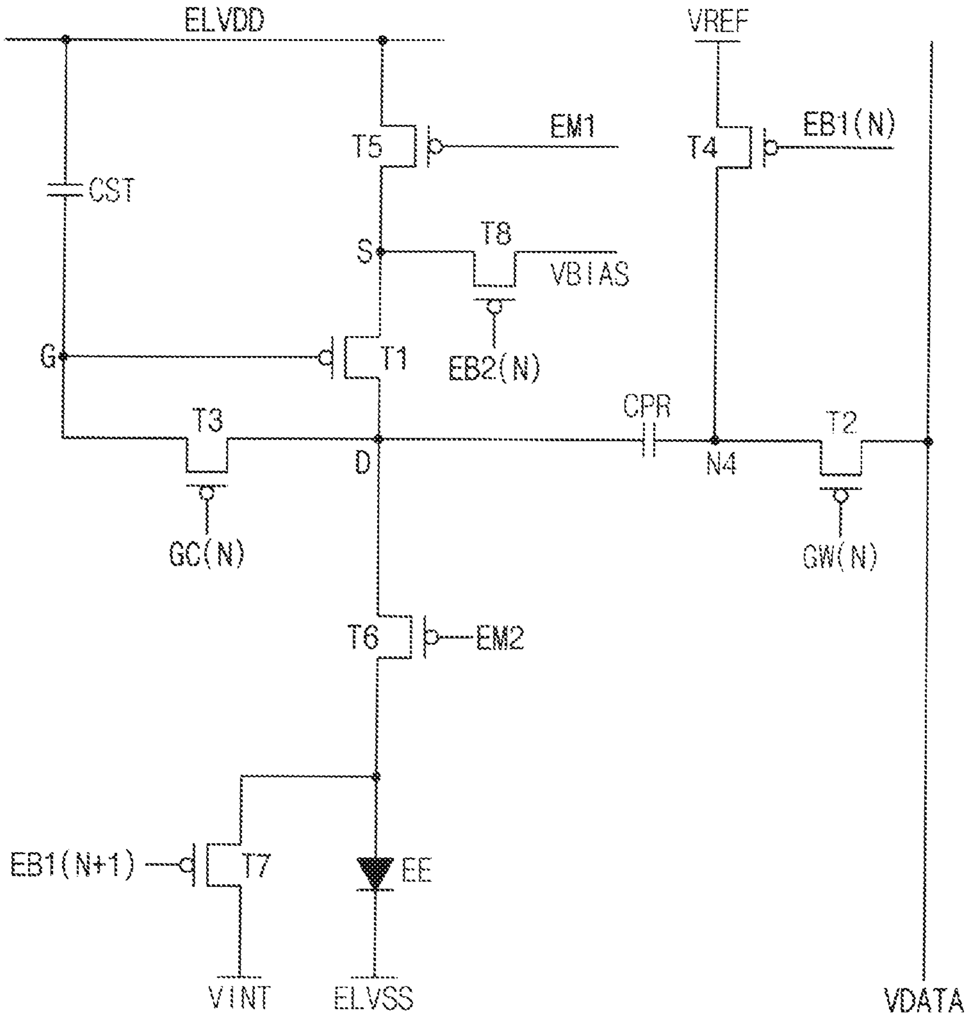
FIG. 16 is a circuit diagram illustrating a pixel of a display panel of a display apparatus according to an embodiment of the present inventive concept.
Figure 17:
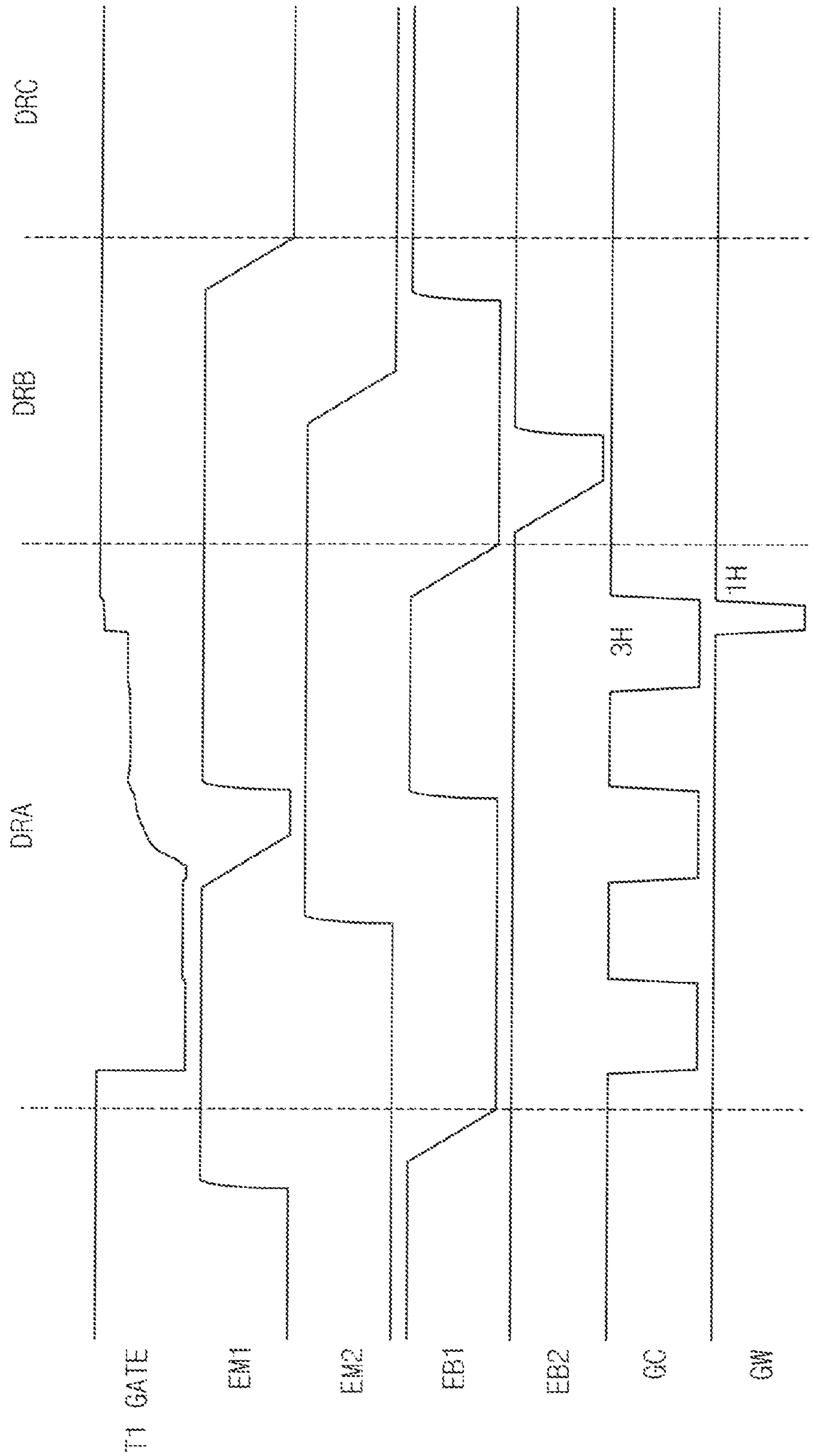
FIG. 17 is a timing diagram illustrating input signals and node signals applied to the pixel of FIG. 16.
Figure 18:
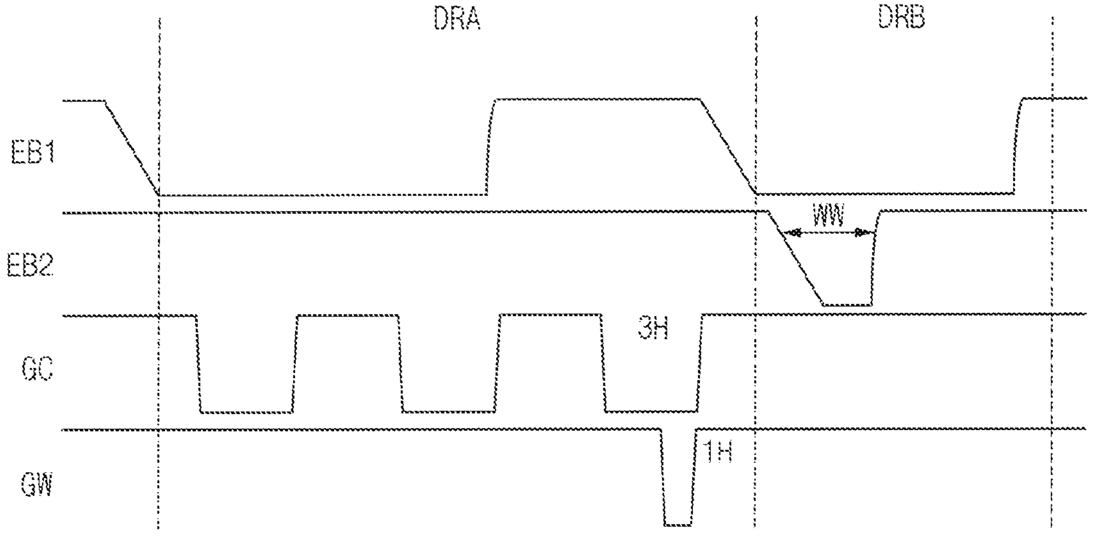
FIG. 18 is a timing diagram illustrating input signals applied to the pixel of FIG. 16 in a writing frame.
Figure 19:
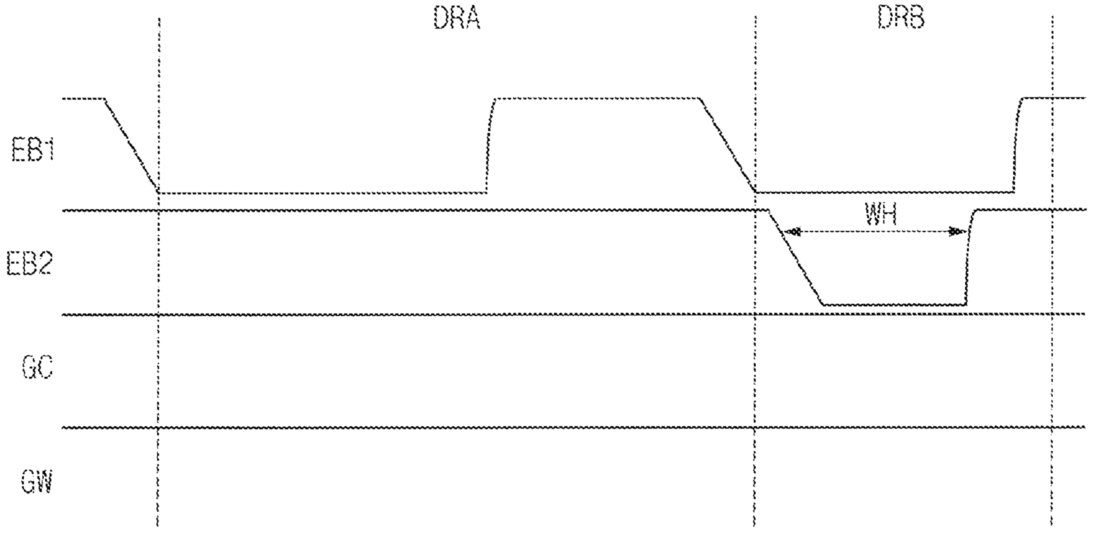
FIG. 19 is a timing diagram illustrating input signals applied to the pixel of FIG. 16 in a holding frame.

FIG. 16 is a circuit diagram illustrating a pixel of a display panel of a display apparatus according to an embodiment of the present inventive concept. FIG. 17 is a timing diagram illustrating input signals and node signals applied to the pixel of FIG. 16. FIG. 18 is a timing diagram illustrating input signals applied to the pixel of FIG. 16 in a writing frame. FIG. 19 is a timing diagram illustrating input signals applied to the pixel of FIG. 16 in a holding frame.

The display apparatus and the method of driving the display apparatus according to the present embodiment is substantially the same as the display apparatus and the method of driving the display apparatus of the previous embodiment explained referring to FIGS. 1 to 13 except for the structure of the pixel of the display panel. Thus, the same reference numerals will be used to refer to the same or like parts as those described in the previous embodiment of FIGS. 1 to 13 and any repetitive explanation concerning the above elements will be omitted.

Referring to FIGS. 16 to 19, the pixel may include a first pixel switching element T1 including a control electrode connected to a first node G, an input electrode connected to a second node S and an output electrode connected to a third node D, a second pixel switching element T2 including a control electrode, an input electrode receiving the data voltage VDATA and an output electrode connected to a fourth node N4, a third pixel switching element T3 including a control electrode, an input electrode connected to the first node G and an output electrode connected to the third node D, a fourth pixel switching element T4 including a control electrode, an input electrode receiving a reference voltage VREF and an output electrode connected to the fourth node N4, a fifth pixel switching element T5 including a control electrode, an input electrode receiving a high power voltage ELVDD and an output electrode connected to the second node S, a sixth pixel switching element T6 including a control electrode, an input electrode connected to the third node D and an output electrode connected to an anode electrode of a light emitting element EE, a seventh pixel switching element T7 including a control electrode, an input electrode receiving an initialization voltage VINT and an output electrode connected to the anode electrode of the light emitting element EE, an eighth pixel switching element T8 including a control electrode, an input electrode receiving the bias voltage VBIAS and an output electrode connected to the second node S, a light emitting element EE including the anode electrode connected to the output electrode of the seventh pixel switching element T7 and a cathode electrode receiving a low power voltage ELVSS, a first capacitor CST including a first electrode receiving the high power voltage ELVDD and a second electrode connected to the first node G and a second capacitor CPR including a first electrode connected to the third node D and a second electrode connected to the fourth node N4.

For example, a bias control signal EB2(N) may be applied to the control electrode of the eighth pixel switching element T8. For example, a first gate signal GW(N) may be applied to the control electrode of the second pixel switching element T2. For example, a second gate signal GC(N) may be applied to the control electrode of the third pixel switching element T3. For example, a third gate signal EB1(N) may be applied to the control electrode of the fourth pixel switching element T4. For example, a fourth gate signal EB1(N+1) may be applied to the control electrode of the seventh pixel switching element T7. Herein, the fourth gate signal EB1(N+1) may be same as the third gate signal EB1(N) applied to a next horizontal line.

As illustrated in FIG. 17, the pixel may operate an initialization operation and a data writing operation in a first duration DRA. In the first duration DRA, the data voltage VDATA may be written to the pixel.

The pixel may operate a bias operation in a second duration DRB. In the second duration DRB, the bias voltage VBIAS may be written to the pixel.

The pixel may emit a light in a third duration DRC. In the third duration DRC, the light emitting element EE may emit the light corresponding to the data voltage VDATA.

As illustrated in FIGS. 18 and 19, in the present embodiment, the bias control signal EB2 to apply the bias voltage VBIAS to the driving switching element T1 may have a first width WW in the writing frame and a second width WH different from the first width WW in the holding frame. In the holding frame, an insufficient degree of the bias may be increased in the holding frame so that the second width WH may be set to be greater than the first width WW.

In addition, in the present embodiment, the bias voltage VBIAS in the writing frame may be equal to the bias voltage VBIAS in the holding frame. In the present embodiment, the power voltage generator 700 may generate the bias voltage VBIAS having a constant level regardless of the writing frame and the holding frame.

According to the present embodiment, the width of the bias control signal EB2 of the writing frame and the width of the bias control signal EB2 of the holding frame may be set differently in the variable frequency driving method or the bias voltage of the writing frame and the bias voltage of the holding frame may be set differently in the variable frequency driving method so that the difference of the degree of the bias of the writing frame and the degree of the bias of the holding frame may be removed in the variable frequency driving method.

Thus, the difference between the luminance in the writing frame and the luminance in the holding frame may be removed in the variable frequency driving method so that the display quality of the display panel 100 may be enhanced.

In addition, the variable frequency driving method within a range in which the deterioration of the display quality is not generated may be operated so that the power consumption of the display apparatus may be reduced.

According to the present inventive concept as explained above, the difference between the luminance in the writing frame and the luminance in the holding frame may be removed in the variable frequency driving method so that the display quality of the display panel may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

Some of the advantages that may be achieved by implementations/embodiments of the invention and/or methods of the invention include***

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display apparatus comprising:

a display panel having a pixel including a first transistor and a light emitting element;

a driving controller configured to determine a driving frequency;

a gate driver configured to output a gate signal and a bias control signal to the pixel;

an emission driver configured to output an emission signal to the pixel; and a data driver configured to output a data voltage to the pixel, wherein the bias control signal to apply a bias voltage to the first transistor has a first width in a writing frame and a second width different from the first width in a holding frame, wherein the pixel comprises:

the first transistor including a control electrode connected to a first node, an input electrode connected to a second node and an output electrode connected to a third node;

a second transistor including a control electrode, an input electrode configured to receive the data voltage and an output electrode connected to a fourth node;

a third transistor including a control electrode, an input electrode connected to the first node and an output electrode connected to the third node;

a fourth transistor including a control electrode, an input electrode configured to receive an initialization voltage and an output electrode connected to the first node;

a fifth transistor including a control electrode, an input electrode configured to receive a reference voltage and an output electrode connected to the fourth node;

a sixth transistor including a control electrode, an input electrode connected to the third node and an output electrode connected to an anode electrode of the light emitting element;

a seventh transistor including a control electrode, an input electrode configured to receive the initialization voltage and an output electrode connected to the anode electrode of the light emitting element;

an eighth transistor including a control electrode, an input electrode configured to receive the bias voltage and an output electrode connected to the second node;

a ninth transistor including a control electrode, an input electrode configured to receive a first power voltage and an output electrode connected to the second node;

the light emitting element including the anode electrode connected to the output electrode of the seventh transistor and a cathode electrode configured to receive a second power voltage;

a first capacitor including a first electrode configured to receive the first power voltage and a second electrode connected to the fourth node; and a second capacitor including a first electrode connected to the fourth node and a second electrode connected to the first node.

2. The display apparatus of claim 1, wherein the second width is greater than the first width.

3. The display apparatus of claim 1, wherein when the driving frequency is a first frequency, the display panel only has the writing frame, and wherein when the driving frequency is a second driving frequency less than the first frequency, the display panel has the writing frame and the holding frame.

4. The display apparatus of claim 1, wherein the bias control signal is applied to the control electrode of the eighth transistor.

5. The display apparatus of claim 4, wherein the bias control signal is applied to the control electrode of the seventh transistor.

6. The display apparatus of claim 1, wherein a first gate signal is applied to the control electrode of the second transistor.

7. The display apparatus of claim 6, wherein a second gate signal is applied to the control electrode of the fourth transistor, wherein a third gate signal is applied to the control electrode of the third transistor and the control electrode of the fifth transistor.

8. The display apparatus of claim 1, wherein a first emission signal is applied to the control electrode of the ninth transistor, and wherein a second emission signal is applied to the control electrode of the sixth transistor.

9. The display apparatus of claim 1, further comprising:

a power voltage generator configured to generate the first power voltage, the second power voltage, the initialization voltage, the reference voltage, and the bias voltage, and to output the first power voltage, the second power voltage, the initialization voltage, the reference voltage, and the bias voltage to the pixel.

10. The display apparatus of claim 9, wherein the bias voltage of the holding frame is greater than the bias voltage of the writing frame.

* * * * *